US009704676B1

(12) United States Patent
Cardwell

(10) Patent No.: US 9,704,676 B1
(45) Date of Patent: Jul. 11, 2017

(54) SLOT MOTOR ASSEMBLY AND ARC PLATE ASSEMBLY COMBINATION

(71) Applicant: Siemens Aktiengesellschaft, München (DE)

(72) Inventor: Justin Michael Cardwell, Dacula, GA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/070,389

(22) Filed: Mar. 15, 2016

(51) Int. Cl.

| | |
|---|---|
| ***H01H 33/08*** | (2006.01) |
| ***H02K 1/06*** | (2006.01) |
| ***H02K 1/02*** | (2006.01) |
| ***H02K 5/08*** | (2006.01) |
| ***H02K 11/27*** | (2016.01) |
| ***H02K 15/14*** | (2006.01) |
| ***H01H 11/00*** | (2006.01) |

(52) U.S. Cl.
CPC ............ *H01H 33/08* (2013.01); *H01H 11/00* (2013.01); *H02K 1/02* (2013.01); *H02K 1/06* (2013.01); *H02K 5/08* (2013.01); *H02K 11/27* (2016.01); *H02K 15/14* (2013.01)

(58) Field of Classification Search
CPC ......... H01H 2009/365; H01H 2201/00; H01H 2300/032; H01H 33/18; H01H 33/6641; H01H 47/002; H01H 50/021; H01H 50/08; H01H 50/54; H01H 71/04; H01H 9/168; H01H 9/44
See application file for complete search history.

(56) References Cited

U.S. PATENT DOCUMENTS 4,743,720 A * 5/1988 Takeuchi ............... H01H 9/302 218/24
4,963,849 A * 10/1990 Kowalczyk ............ H01H 9/342 218/35
6,229,418 B1 * 5/2001 Mueller ................. H01H 9/287 335/172
2005/0264388 A1 * 12/2005 Mueller ............. H01H 71/0257 335/202
2008/0079519 A1 * 4/2008 Shea .................... H01H 77/108 335/201
2015/0028973 A1 * 1/2015 Cardwell ............. H01H 77/108 335/6
2015/0041436 A1 * 2/2015 Ferree .................. H01H 77/102 218/32

* cited by examiner

*Primary Examiner* — Truc Nguyen

(57) ABSTRACT

A modular slot motor assembly and arc plate assembly combination for a circuit breaker is disclosed. The modular slot motor assembly is positioned proximate the arc plate assembly by lockingly securing it to a subcomponent housing in order to better provide an enhanced separation of the contact arms. During a short circuit event the modular slot motor assembly provides added acceleration to a moving contact arm. To protect the modular slot motor assembly from damage, an insulating casing is applied to at least a portion of the modular slot motor assembly.

18 Claims, 10 Drawing Sheets

SLOT MOTOR ASSEMBLY AND ARC PLATE ASSEMBLY COMBINATION

FIELD

The present invention is directed generally to circuit breakers and more specifically to circuit breakers adapted to be used with a slot motor and arc plates to facilitate the separation of contact arms.

BACKGROUND

Generally circuit breakers utilize a contact arm assembly comprising moveable contacts attached to the contact arms and stationary contacts attached to a line terminal and in some cases utilize several pairs of moveable and stationary contacts per phase. Usually one of the contacts in each pair is a fixed or stationary contact, while the other contact is a movable contact coupled to the operating mechanism of the circuit breaker. When operational, the stationary and the moveable contacts are closed and touch at the contact pads of the contacts. In the closed condition, the contact pair forms a current pathway between the line and load sides of the circuit breaker.

In the field of circuit breaker design, it is desirable to provide as much protection to the consumer and their electrical equipment as possible. During a fault event, a circuit breaker must respond as quickly as possible to protect connected equipment by negating or minimizing any damage to the connected equipment. To achieve this goal, circuit breakers respond to a fault event by blowing apart the moveable and stationary contacts as a result of magnetic repulsion forces created under high current conditions such as for example, a short circuit fault event.

Although high current conditions are generally sufficient to separate the moveable and stationary contacts of the circuit breaker, slot motors have been used to increase the speed of contact arm separation and thereby enhance separation performance. Slot motors are devices that function as magnetic accelerators that enhance the separation speed of the moving contract arm, away from the stationary contact arm, and directs the resulting arc towards the splitter arc plates. By shortening the life of the arc, the amount of let through energy is reduced and the amount of potential damage to both the circuit breaker and to the connected equipment is diminished.

The slot motor is generally a device surrounding a portion of the contact arm assembly 102 and is made from a magnetically permeable material, such as steel. In the event that the circuit breaker is tripped, an arc may be formed between the contact arms assembly and then drawn out by the motion of the moving contact arm towards a series of arc plates so as to divide or split and ultimately extinguish the arc. During this separation process, the arc produces a current which electromagnetically then induces a magnetic field in the magnetically permeable material of the slot motor assembly. The induced magnetic field enhances the repulsion forces at work between the stationary and contact arms so as to more quickly separate and stretch out and extinguish the arc.

The measure of performance of these interruption assemblies in circuit breakers, is quantified in terms of the amount of let through current and let through energy is allowed during a fault event. The quicker the response, the less let through energy is allowed. As such, the speed of contact separation is an important factor in minimizing damage to the circuit breaker and damage to the connected equipment.

In the manufacture of circuit breakers, the slot motor is generally placed in close proximity to the contact arm assembly, and around the pathway of travel between the load and line side of the circuit breaker. The slot motor assembly is generally made as a separate component and distinct from the contact arm assembly, and therefore must be inserted or placed adjacent to the contact arms during circuit breaker manufacture. However, due to the increasing need for further miniaturization of circuit breakers while maintaining or enhancing its functionality, the use and manufacture of circuit breakers is becoming a greater challenge. The present invention addresses the problem by utilizing a contact arm assembly, line terminal assembly, arc plate assembly and slot motor assembly in a certain configuration and by using certain ablative materials so as to quickly extinguish an arc. Moreover, the present invention addresses the need for modularity in design and the need for ease of manufacture. This invention maximizes the usage of available space by providing as much magnetically permeable material as reasonably possible while being modular in design and by enabling components of the slot motor assembly to be easily assembled within and/or around the contact arm assembly

SUMMARY

The present invention provides a slot motor assembly and an arc plate assembly combination for extinguishing an arc created during a fault event. The slot motor is covered by an epoxy coating and/or an ablative casing to protect circuit breaker components and associated equipment. The slot motor assembly comprises a multi-piece design for ease of manufacture. The slot motor assembly and the arc plate assembly are positioned to help separate the contact arms and draw the resulting arc towards the arc plate assembly. The arc is extinguished as the arc is elongated between the contact arms.

DETAILED DESCRIPTION

Figure 1:
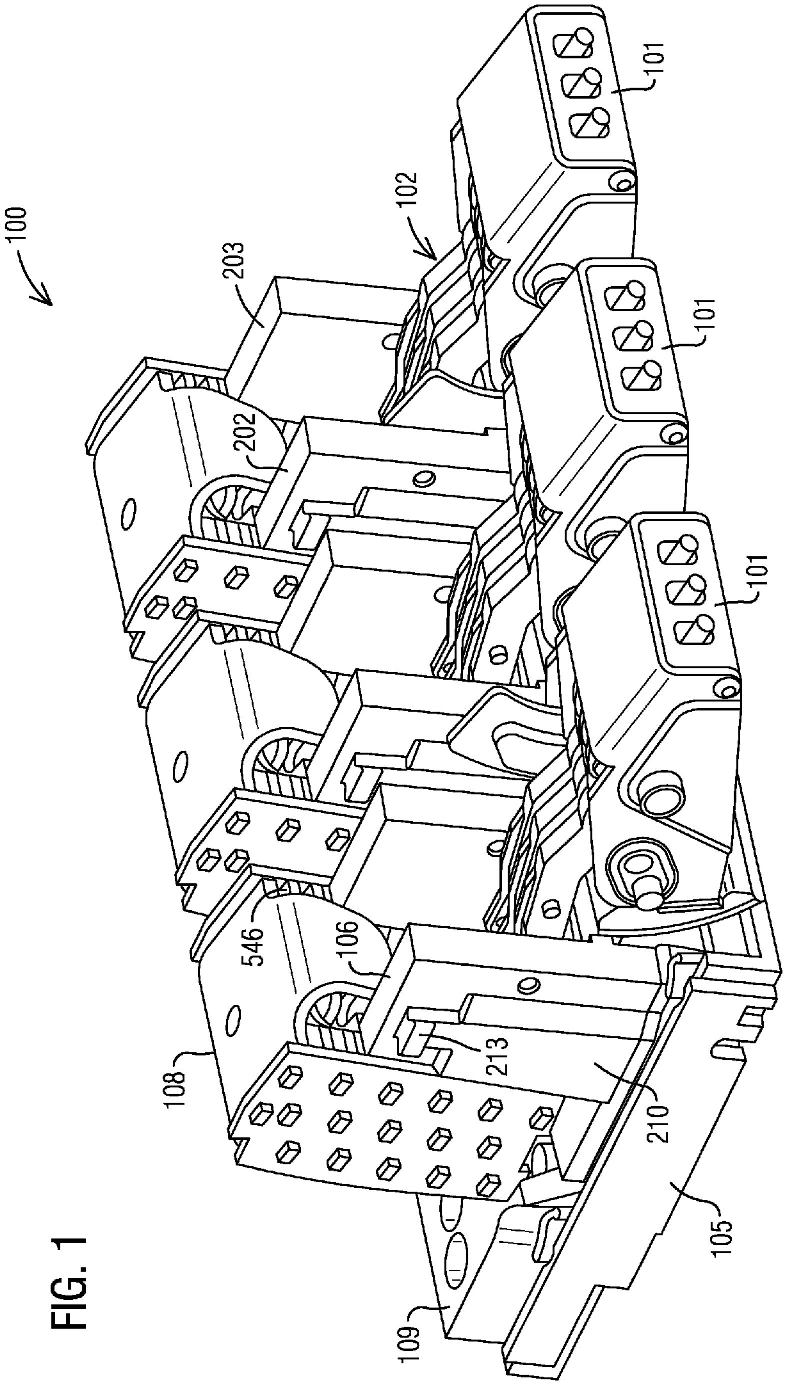
FIG. 1 is an isometric view of a circuit breaker subcomponent housing having three circuit breaker assemblies, each comprising a line terminal assembly, arc plate assembly, slot motor assembly, contact arm assembly and electrical contact apparatus.

Referring now in specific detail to FIG. 1, three circuit breaker assemblies 100 in a three pole circuit breaker are shown. And although three circuit breaker assemblies 100 are shown it should be understood that one, two, three or more circuit breaker assemblies 100 may be used in a circuit breaker or switch without departing from the invention. More specifically, each of the circuit breaker assemblies 100 may be used on a per phase basis in a single pole or a multi-pole circuit breaker configuration. Each of the circuit breaker assemblies 100 generally comprise an electrical contact apparatus 101, contact arm assembly 102, slot motor assembly 106, arc plate assembly 108 and a line terminal assembly 109 located within a housing subcomponent 105.

As shown in FIG. 1, each circuit breaker assembly 100 may be oriented in a side-by side configuration. In the depicted embodiment, the electrical contact apparatus 101 may be identical to one another, and each may be adapted to receive a single phase provided from a polyphase electrical power distribution system (not shown). The electrical contact apparatus 101 functions as the connection point to the load side of the electrical circuit as well as the contact arm assembly 102 on the other side. Contact arm assembly 102 comprises a set of one or more contact arms 103*a*, 103*b* and each set comprising a stationary contact arm 103*a* and a moveable contact arm 103*b*. The stationary contact arm 103*a* is connected to the line terminal assembly 109. Surrounding the contact arms 103*a* and 103*b* is the slot motor assembly 106. In FIG. 1, the slot motor assembly 106 substantially surrounds the contact arms 103*a*, 103*b* on the sides as well as below the stationary contact arm 103*a*.

In the depicted circuit breaker assembly 100 in FIG. 1, the slot motor assembly 106 comprises a base component 201 and two side legs 202, 203. The base component 201 of the slot motor assembly 106 is placed between a primary portion 301 and an opposing portion 302 of the line terminal assembly 109. (See FIG. 2). In the embodiment shown in FIG. 1, the legs 202, 203 rest on the upper surface of base component 201 in a substantially perpendicular direction. In turn, the line terminal assembly 109 rests on the interior surface of housing subcomponent 105 that is preferably part of a multi-piece circuit breaker housing.

Moreover, the slot motor assembly 106 is positioned close to the arc plate assembly 108 as shown in FIG. 1. The arc plate assembly 108 comprises a plurality of arc plates 546 used to extinguish an arc generated during the separation of the contact arms 103*a*, 103*b* such as during a short circuit event. (See FIG. 15). The slot motor assembly 106 and arc plate assembly 108 cooperate to extinguish the resulting arc.

In operation, the slot motor assembly 106 and the arc plate assembly 108 function to intensify a magnetic field which crosses through the arc during a fault event. By intensifying the magnetic field, the magnetic repulsion forces on the arms 103*a*, 103*b* are increased so that the one or more contact arms 103 blow open more quickly. By quickly lengthening the distance between the moving and stationary contact arms 103*a*, 103*b*, a rapid increase in an opposing arc voltage is created, which tends to more rapidly extinguish the arc. Moreover, the intensified magnetic field increases the magnetic arc forces tending to drive the arc into the arc plates 546 of the arc plate assembly 108 more rapidly. Effectively, the arc may be more quickly driven into the spaces between the arc plates 546. This may also increase the opposing arc voltage more rapidly, because of the effects of anode/cathode fall and cooling of the gases which reduces conductivity.

As one advantage of the present invention, the combination of the slot motor assembly 106 and the arc plate assembly 108 enable an increased level of magnetic flux so as to enhance interruptional performance. Moreover under this configuration, performance may be maintained while allowing for a reduction in the size of the circuit breaker housing. Another advantage of present invention is that the slot motor assembly 106 is modular and may be more easily installed during the manufacturing process and therefore manufacturing costs may be lowered.

Figure 2:
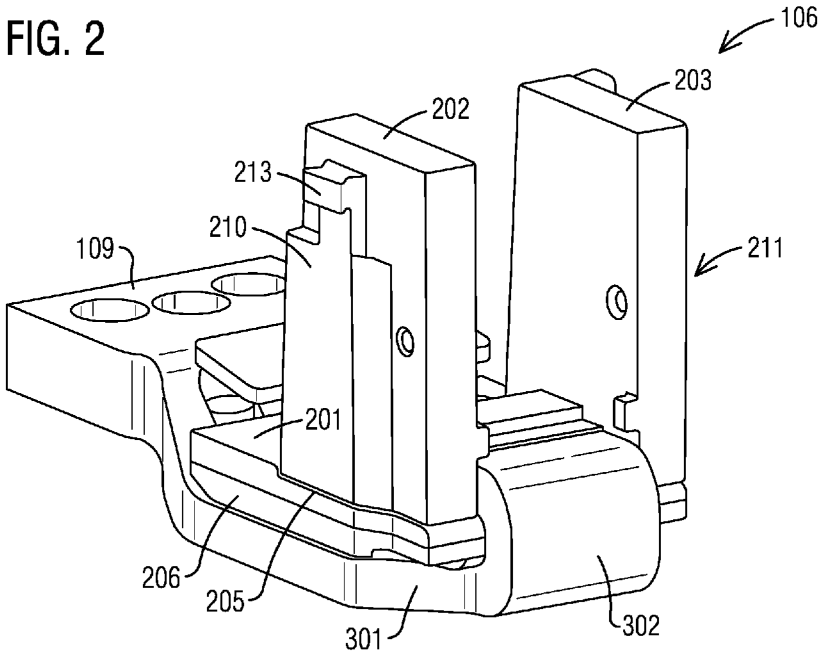
FIG. 2 is an isometric view of the line terminal assembly, and slot motor assembly.
Figure 3:
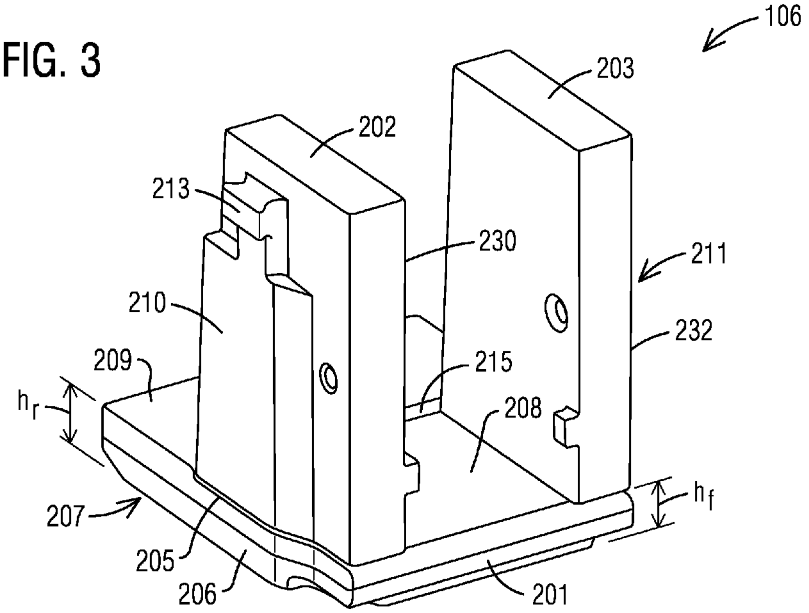
FIG. 3 is an isometric view of the slot motor assembly.

Shown in FIGS. 2-3 is a more detailed depiction of the slot motor assembly 106 for use in a circuit breaker in accordance with an embodiment of the present invention. The slot motor assembly 106 may for example, be used in each of the phases regularly used in a multi-phase operation. In this multi-part and modular embodiment of the present invention, three (3) parts of the slot motor assembly 106 comprising the base component 201, and legs 202, 203 are shown. The base component 201 functions, among other things, as the platform upon which the left and right legs 202 and 203 respectively rest or contact. As shown in FIG. 3 the base component 201 is comprised of an upper casing 205 and a lower casing 206 which when joined together to form a casing 207.

Moreover FIGS. 2-3 show several more features of the base component 201. In particular, FIG. 3 shows a base component 201 shaped to maximize the space available within and about the contact arm assembly 102, line terminal assembly 109 and arc plate assembly 108. In this embodiment, the height $h_f$ of the front portion 208 is preferably smaller than that of the height $h_r$ of the rear portion 209 of casing 207 to allow for the front of base component 201 to be insertable between the opposing portion 302 and primary portion 301 of the line terminal assembly 109. FIG. 3 demonstrates the curved contours of the base component 201 and contours of legs 202, 203 and side panels 210, 211 that are design specific and may be used to maximize space usage and complement the contours of other components within the interior space of the circuit breaker housing.

Figure 4:
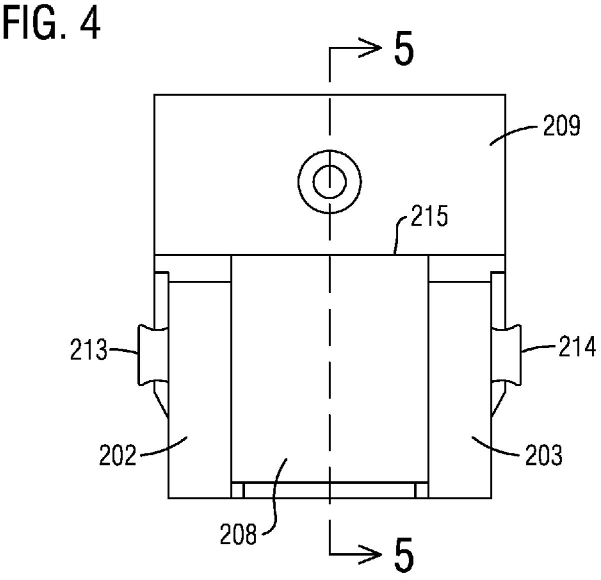
FIG. 4 is a top view of the slot motor assembly in FIG. 3.
Figure 5:
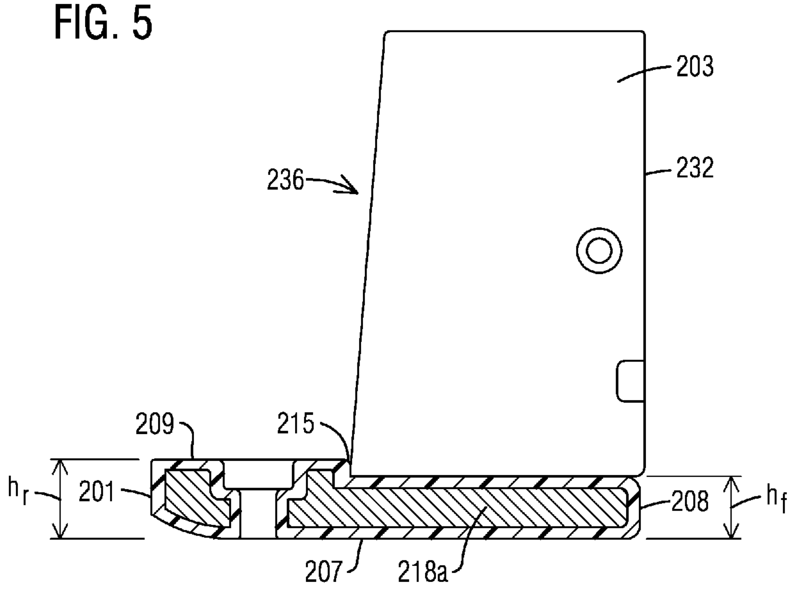
FIG. 5 is a cross-sectional view of the slot motor assembly in FIG. 4 along line 4-4.
Figure 6:
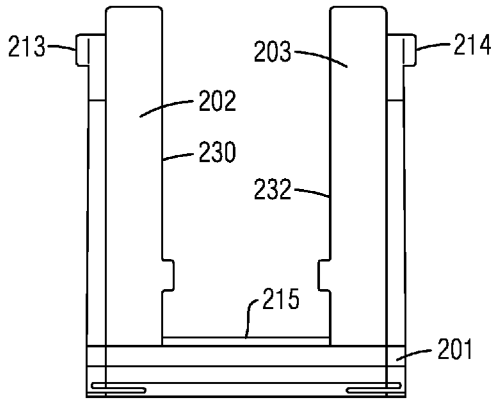
FIG. 6 is a front view of the slot motor assembly in FIG. 3.

Shown in FIGS. 4-10 are various isometric and cross sectional views of the slot motor assembly 106. In FIG. 4, the slot motor assembly 106 is shown from a top view with both legs 202, 203 and side panels 210, 211 resting on or contacting the surface of a front portion 208 of the base component 201. FIG. 5 shows a cross-sectional view along line 4-4 of FIG. 4. The base component 201 is shown as having a casing 207 around the magnetically permeable material 218*a*. FIG. 6 is a frontal view of the slot motor assembly showing front faces 230, 232. It should be understood that the rear portion of the base component 201, may be configured in any shape or height to accommodate the needs of the circuit breaker. Although in this embodiment the height of the riser 215 is relatively small, other embodiments may have substantially greater riser 215 height.

In FIGS. 3, 4-8, the riser 215, between the front portion 208 and rear portion 209 of casing 207 (and magnetically permeable material 218*a*) serves several functions. In particular, the rise in height, as shown in riser 215 allows for a greater amount of magnetically permeable material 218*a* to be used at the rear portion 209 of the base component 201 while also functioning as an insertion guide for placement of the legs 202, 203. The legs 202, 203 of the slot motor assembly 106, are insertable by positioning the base of the legs 202, 203 with the edge of the riser 215. Moreover, riser 215 also helps in addition to the locking components 213, 214 to keep the legs 202, 203 in place on the upper surface of the base component 201.

Each of the legs 202, 203 may include a slight taper (e.g., draft angle) in each dimension from bottom to top. In particular, the legs 202, 203 may be made narrower at distances further away from the base component 201—primarily because it is believed to be non-critical to have high blow-apart force on the one or more moveable contact arms 103*b* after the one or more contact arms 103*b* are sufficiently separated from the stationary electrical contact arm 103*a*. The use of powdered metal is also thought to reduce the conductivity of the slot motor assembly 106, which may advantageously cause the slot motor assembly 106 to carry less eddy currents.

Referring now to FIGS. 4-8, it can be seen that the second leg 203 may comprise a non-uniform transverse thickness. In particular, the second leg 203 may include a horizontal cross-sectional shape that varies along a longitudinal direction 206L aligned with the front face 232 and the rear face 236. The thickness dimension of the non-uniform transverse thickness of second the leg 203 may comprise a thickness ($t_r$) near rear face 236 that is of a relatively greater thickness than a thickness ($t_f$) of a front portion near front face 232. (see FIG. 8) The first leg 202 may be a mirror image of the second leg 203, and, thus, may also have non-uniform transverse thickness. The thickness of the legs 202, 203 may be made relatively thinner at portions (e.g., front face 232) in this manner, and may allow a means for securing such as fasteners to be installed in the circuit breaker in this position without widening an overall width of the circuit breaker. In general, the magnetic flux is lower in this region, so making the legs 202, 203 in this region thinner represents a design compromise.

Figure 7:
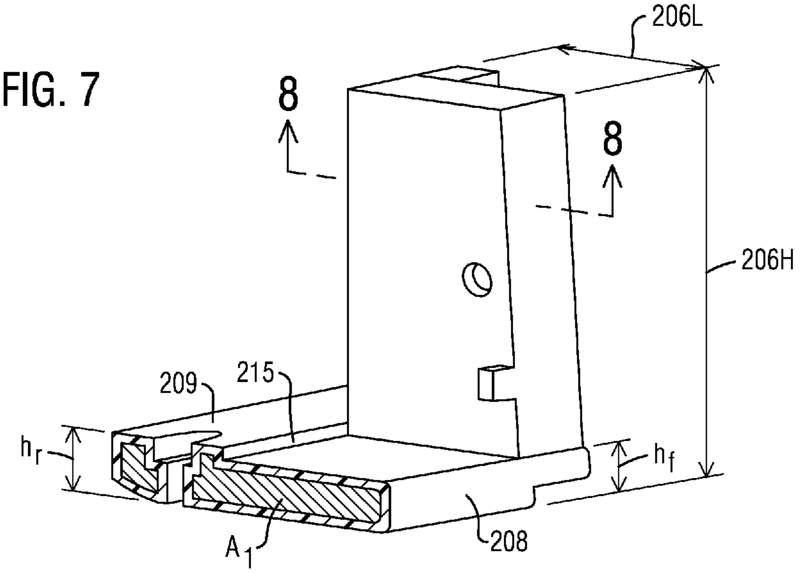
FIG. 7 is an isometric cross-sectional view of the slot motor assembly in FIG. 5.
Figure 8:
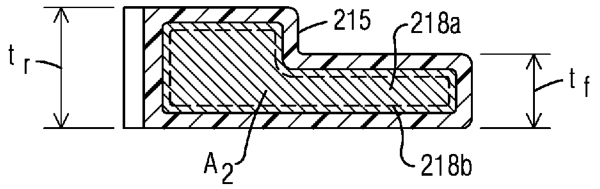
FIG. 8 is a cross-sectional view of leg along line 7-7.
Figure 9:
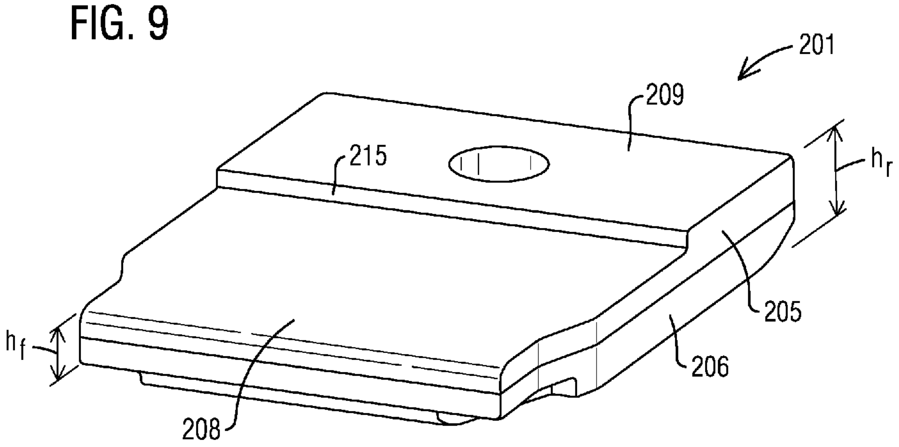
FIG. 9 is an isometric view of the base component.

As shown in FIGS. 5 and 7, the base component 201 may include a vertical cross-sectional shape that varies along the longitudinal direction 206L. The height ($h_f$) of the front portion 208 may be made relatively thin in vertical thickness, so that the opposing portion 302 and primary portion 301 of line terminal assembly 109 may be bent over itself in a relatively tight radius. This allows the height of the combined slot motor assembly 106 and line terminal assembly 109 to be reduced. In one or more embodiments, the height ($h_f$) of the front portion 208 may be less than a height ($h_r$) of the rear portion 209 of base component 201. Any magnetic flux carrying capacity that is lost due to making the front portion 208 relatively thinner is regained by providing a relatively larger height ($h_r$) of the rear portion 209. Moreover, as will be apparent, projecting the rear portion 209 at least partially underneath of the arc plate assembly 108 and moving the are plate assembly 108 very close to the rear faces 234, 236 of the slot motor assembly 106 allows the slot motor assembly 106 and the are plate assembly 108 to cooperate and carry a greater flux density. As should be apparent, the rear height ($h_r$) of the base component 201 and the rear thickness ($t_r$) of legs 202, 203 are preferably greater than the front height ($h_f$) and front thickness ($t_f$) respectively.

In another feature of the present invention, the cross-sectional area (A1) of the combined magnetically permeable material 218*a* of the front portion 208 and rear portion 209 of base component 201 may be greater than a cross-sectional area (A2) of the combined magnetically permeable material 218*a* of legs 202, 203 and side panels 210, 211 anywhere along the vertical direction 206*h* For example, the ratio of A1 and A2 may be as provided in Eqn. 1:

$$A1 \geq C * A2 \qquad \text{Eqn 1}$$

wherein C is a constant preferably greater than about 1.5, or even greater than about 1.6, or even greater than about 1.7 in some embodiments.

Preferably cross-sectional area (A2) at the base of leg 203 (cross-sectional area closest to the surface of base component 201) should be as large as the cross-sectional area (A1) or at least substantially close to the cross-sectional area (A1). However it should be understood that this relationship is not necessary, although it is a preferred relationship between (A1) and (A2).

In the manufacturing process, the stand alone base component 201 is easily insertable within the line terminal assembly 109 without the need to be concerned about the subsequent positioning of the legs 202, 203 of the slot motor assembly 106. More specifically, the modular construction of the slot motor assembly 106 allows for the quick positioning of the base component 201 between the primary portion 301 and opposing portion 302 of terminal assembly 109, followed by the insertion of the two side legs 202 and 203. Legs 202, 203 are mounted on the upper surface and towards the front of the base component 201.

In one embodiment of the present invention, each leg 202 and 203 may comprise side panels 210 and 211. The side panels 210, 211 are attached to the sides of legs 202 and 203 and function, among other things, to provide additional space for inclusion of additional magnetically permeable material 218*a*. Side panels 210, 211 may be separately made and insulated and later joined to legs 202 and 203 or they may be made integral to legs 202 and 203. Within the legs 202, 203 and side panels 210, 211, magnetically permeable material of the same or of a different type may be used in the base component 201 depending on the acceleration needed for contact arm separation. Moreover, the side panels 210, 211 further comprise a first mating feature as a means for securing the legs 202, 203 and side panels 210, 211 to the housing subcomponent 105 of the circuit breaker.

Figure 11:
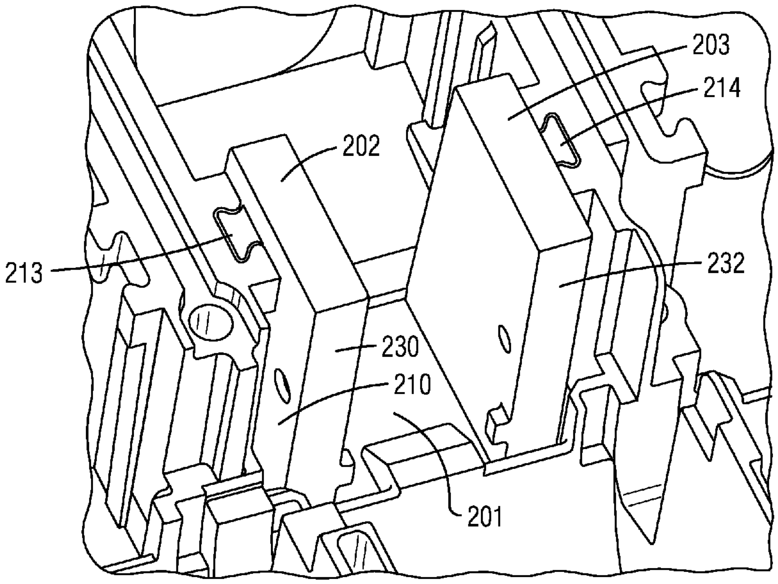
FIG. 11 is an isometric view of the base component, and two legs positioned within the subcomponent housing of the circuit breaker and wherein a locking component is attached to one of the legs.

In the embodiments shown in FIGS. 3 and 11, the side panels 210, 211 comprise a first mating feature as a means for securing comprising locking components 213 and 214 (214 not visible in FIG. 2*b*) in the form of dovetails, for example, that slidably engage with a second mating feature as a mating portion 217 in housing subcomponent 105. The mating portion 217 may be a portion of a wall within the subcomponent 105. The locking components 213, 214 may or may not be filled with a magnetically permeable material since its primary function is to provide a means for securing the legs 202, 203 and side panels 210, 211 to the housing subcomponent 105 of the circuit breaker. Moreover, the locking components 213, 214 may be attached to either the legs 202, 203 or side panels 210, 211 of the slot motor assembly 106. Alternatively, the locking components 213, 214 may be part of the subcomponent housing 105, while the mating portion 217 may be part of the slot motor assembly 106.

In one embodiment, the locking components 213, 214 are dovetailed shaped and made of plastic capable of withstanding repeated removal and insertion of the legs 202, 203 and side panels 210, 211 and capable of withstanding the heat generated under normal operating conditions and under a short circuit event. Together, the locking components and the mating portion 217 comprise a means for securing the legs 202, 203 and side panels 210, 211. Alternatively, the means for securing may take the form of other well known interference fit, friction fit, snap fit, and mating or locking methods. Preferably the means for securing is one used to allow for repeatedly removal and insertion of legs 201, 202 and side panels 210, 211. More specifically, the locking component 213, 214 may take other formations such that the locking components 213, 214 are mateable with a mating portion 217 of the subcomponent housing 105.

Figure 12:
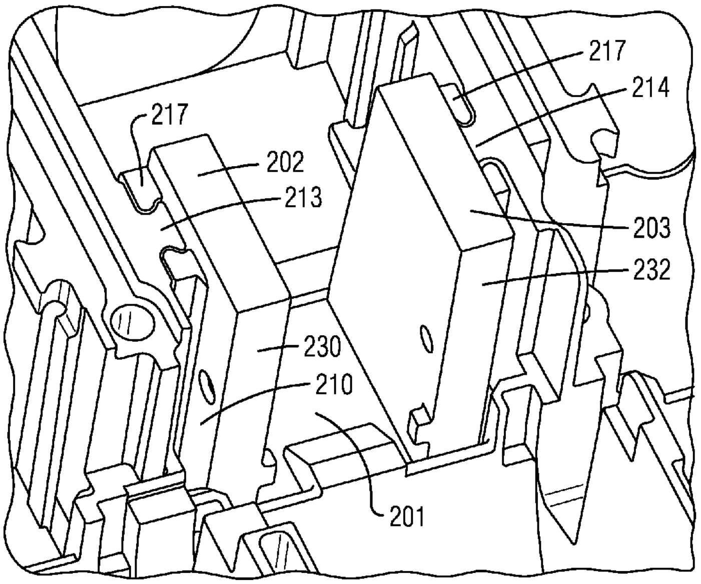
FIG. 12 is an isometric view of the base component, and two legs positioned within the subcomponent housing of the circuit breaker and wherein a locking component is attached to one of the subcomponent side wall.
Figure 13:
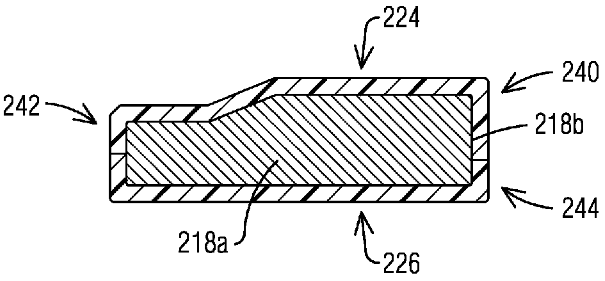
FIG. 13 is a cross-sectional view of the base component within an upper and lower mold.

In another embodiment, the means for securing may take the form of fasteners such screws, clips, and other connecting means to housing subcomponent 105. Yet still and as shown in FIG. 12, the means for securing may take the form whereby the locking components 213, 214 are part of the wall of the subcomponent 105 and the mating portion 217 is part of the side panels or if no side panels are used, is part of the legs 202, 203.

Figure 15:
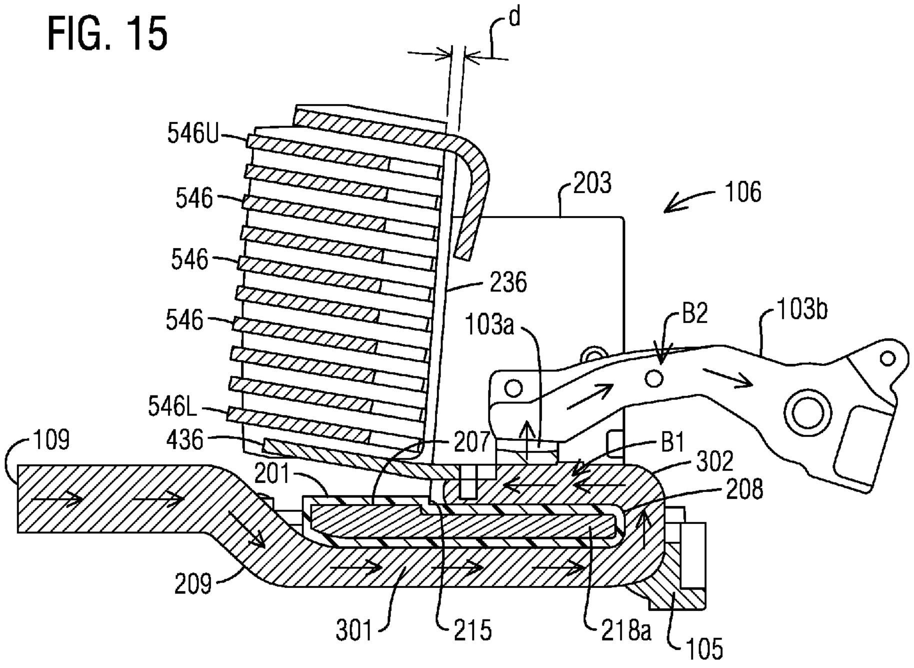
FIG. 15 is a cross-sectional view of the line terminal assembly, arc plate assembly, slot motor assembly and contact arm assembly.

As shown in FIG. 15, the rear portion 209 of the base component 201 extends preferably beneath and within the openings of the arc plate assembly 108. Moreover, it is preferable that rear portion 209 be very close to the rear faces 234, 236 of the slot motor legs 202, 203. In this manner, the slot motor assembly 106 and the arc plate assembly 108 are able to carry a higher flux density and thereby enhance the operational performance in blowing the contact arms apart.

Figure 10:
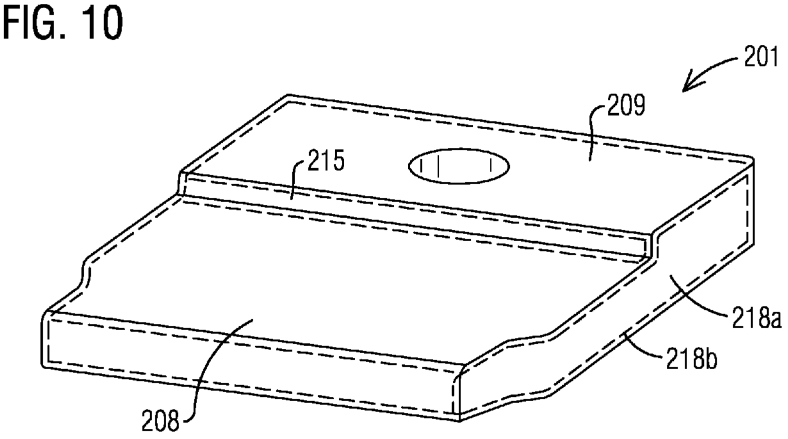
FIG. 10 is an isometric view of the magnetically permeable material of the base component with a coating.
Figure 14:
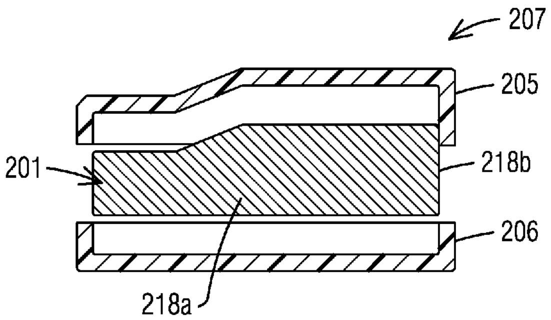
FIG. 14 is an exploded view of the base component showing the upper and lower casing and magnetically permeable material with a coating.

To provide protection against the damaging effects of an arc, the slot motor assembly 106 is shielded by one or more insulating layers of electrical and/or thermal protection such as coating 218*b* and casing 207 (See FIGS. 10 & 14). It should be understood however, that although the application of a coating and a casing will be discussed with reference to the base component 201, the same process and procedures may be used for the coating and casings to the legs 202, 203 and side panels 210, 211.

As shown in FIGS. 7-10 and 13-14, the casing 207 encases a magnetically permeable material 218*a* such as steel, in the form of cold rolled or cold drawn carbon steel, powdered/sintered iron, annealed pure iron and other similar magnetically permeable materials. The magnetically permeable material 218*a* is preferably shaped in substantially the same shape as the casing 207 (see FIG. 14) and is preferably applied with a coating 218*b* such as a plastic, epoxy or any other suitable insulating material coating so as to insulate the magnetically permeable material 218*a* from the effects of a short circuit strike. The magnetically permeable material 218*a*, may be made by various manufacturing processes, such as die compaction, sintering, forging, metal injection and the like. Alternatively, the magnetically permeable material 218*a* may be manufactured by laminating thin strips of magnetically permeable material to create the desired shape of any of the slot motor assembly 106 components.

In a preferred embodiment, the coating 218*b* that may be used, is a powder coated epoxy applied by a powder coating process. The coating 218*b* is applied to minimize the potential harm caused by potential electric shorts within the housing of the circuit breaker and to minimize the overall thickness of the base component 201, legs 202, 203 and side panels 213, 214 while providing insulating properties. In this embodiment, the thinner the thickness of the coating 218*b* allows for a greater amount of magnetically permeable material 218*a* to be encased in casing 207. The thickness of the coating 218*b* is preferably kept at a minimum while retaining its insulating properties. However in one embodiment, it is preferable for the thickness of the epoxy coating 218*b* of the magnetically permeable material 218*a* in base component 201 and legs 202, 203 and side panels 213, 214 to be within the range of 0.2 mm to 2 mm and preferably about 1 mm. The coating 218*b*, although optional, is useful in enhancing protection and minimizing the conduction of an arc from the contact pads, to portions of the line terminal assembly 109, the legs 202, 203, side panels 210, 211 and base component 201.

There are various ways to apply powder coating to an electrical component and perhaps the two most common ways of application are the fluidized bed and electrostatic spray methods. The fluidized bed method necessitates the pre-heating of an electronic component. The electronic component is then passed through a cloud of suspended epoxy powder, and while in the heated state, the epoxy powder adheres to the electronic component. As applicable to one embodiment of the invention, the magnetically permeable material 218*a* of base component 201, and legs 202, 203, side panels 210, 211, for example, may be heated and passed through a suspended cloud of epoxy powder so as to coat the entire magnetically permeable material 218*a* with epoxy. After the epoxy powder initially adheres to the magnetically permeable material 218*a*, the base component 201, side panels 210, 211 and legs 202, 203 are placed in an oven to allow for the epoxy to be fully cured. Depending on the geometry and the desired thickness of the epoxy coating, the process may be repeated several times.

In an alternate method, an electrostatic spray may be used to apply the epoxy to the base component 201, side panels 210, 211 and legs 202, 203. The use of an electrostatic spray requires that a charged interaction exist between the magnetically permeable material 218*a* and the epoxy powder 218*b*. Typically, component parts to be coated are racked and grounded, then moved into a spray booth with the appropriate powder coating apparatus. The epoxy powder is fed into an application sprayer that charges the epoxy powder to be applied. The powder electrostatically adheres to the surface of the electronic component. Depending on the electronic component, this method offers the advantage that normally no pre-heating is required for coating thickness of less than 8 mm. After the powder has been applied, the electronic component is once again placed in an oven to allow curing to occur. If an electromagnetic component such as the magnetically permeable material 218*a* for example, as in the base component 201, side panels 210, 211 and legs 202, 203 are relatively flat or have an open geometry such that the epoxy powder can be evenly distributed, it is preferable that the electrostatic spray method be used.

In addition, the casing 207 may be used with or without the coating 218*b*, and can be applied to the magnetically permeable material 218*a* in the base component 201, legs 202, 203, and side panels 210, 211. Encasement can be achieved in any one of several ways known to one skilled in the art and may include for example the use of various types of injection molding such as overmolding or any other encasing molding process. In any event, the casing 207 may comprise of polymeric materials such as thermoset plastics, or the like and can be used to partially or substantially seal most or all of the magnetically permeable material 218*a*.

In addition to its insulative properties, it should be understood that some polymeric materials vaporize when exposed to high-energetic, high-intensity thermal plasma arcs generated between the two contact arms 103*a*, 103*b* during a high fault current. The generated vapours through the process of ablation assist to efficiently control and extinguish the energy dissipated in the plasma arc such that currents can be quickly interrupted. An ablative plastic tends to absorb heat while protecting the electrical component that it covers. In the process, the ablative plastic decomposes as it absorbs heat and generates a gas which helps to extinguish the arc. The process allows the ablative material at the surface to decompose and reveal a new ablative surface that will function as an electrical and thermal barrier.

Examples of ablative "outgassing" materials that help with extinguishing an arc include Nylon 6 and Nylon 6/6. Nylon may be used with a significant percentage of an inert filler as outgassing material. In general, the arc vaporizes the nylon resin, creating a large volume of gas that helps blow the arc into the splitter plates, and also cools the arc by the rapid expansion of gasses. The inert filler material controls how much of the nylon is ablated. By adding more inert filler (which has higher melting point and doesn't generate gas), this reduces the amount of gas generated, to prevent bursting of the breaker housing. Also, it prevents complete melting or burn-through of the ablative material, which could cause other problems. For example, blobs of molten nylon might get stuck on other parts and interfere with their function. Or, if the nylon is completely gone, the metal of the slot motor might become exposed resulting in undesired current flow in the slot motor, which would short-circuit the arc chamber and prevent it from functioning.

Another material that may be used is thermoset polyester, which is reinforced with up to 20% glass fiber for strength (the glass fiber also acts as an inert material with benefits described above) and the common flame retardant alumina trihydrate $Al(OH)_3$. $Al(OH)_3$, when heated, breaks down into gaseous $H_2O$ (water) and other compounds. This material was developed for its flame retardant properties, but it also works well to help blow out the arc. On the molecular level, electron target cross-sections work—likelihood of various species of ion molecules interfering with movement of free electrons in the arc plasma, etc.

There are various insulating and ablative materials which can be used as a casing, each with their own specific characteristic properties. In one embodiment of the present invention, Nylon 6/6 is for example is a suitable material made of hexamethylenediamine and adipic acid. However, other suitable ablative or out-gassing materials may also be used. For example, glass or mineral filled Nylon or other polymers such as polyamides may be used. As should be apparent, the combination of the casing 207 and the coating 218*b* on the magnetically permeable material 218*a* of slot motor assembly 106 provides for an improved two-part insulation system. Any combination of an insulating layer coating (e.g., epoxy) and ablative material may be used. Other ablative materials such DELRIN™ polyacetal, CYMEL™ molding compound, cellulose-based vulcanized fiber, or melamine may also be used.

Encasement of the magnetically permeable material 218*a* may be accomplished in various ways. For example, and as shown in FIG. 11, the base component 201 may be placed in a mold 240 comprising of an upper and lower mold 242, 244. The upper and lower molds 242, 244 are configured in the desired shape suitable for the encasement of the magnetically permeable material 218*a* and for insertion between the primary portion 301 and the opposing portion 302 of the line terminal assembly 109. Injection molds such as upper and lower molds 242, 244 are usually made using either steel or aluminium, and are machined to form the features of the base component 201, side panels 210, 211 and legs 202, 203.

Preferably and to minimize waste, the cavities within the upper and lower molds 242, 244 are substantially contoured to the surface of the base component 201, side panels 210, 211 and legs 202, 203. Based on the desired thickness of the casing 207, a mold clearance distance between the surface of the base component 201 and the surface of the cavities of the upper and lower mold 242, 244 is provided.

After having been heated to a flowing state, the casing 207 is fed into injection ports 224 and 226 via an external pressure such as a reciprocating screw, ram injector or a mechanical plunger. The heated casing 207 enters the upper and lower molds 242 and 244 and surrounds all or portions of the magnetically permeable material 218*a* of base component 201. Once the casing 207 has covered all or the desired portion of the base component 201 for example, it is allowed to cool down and harden. It should be understood that although the present embodiment details coverage of the entire slot motor assembly 106, the application of the casing 207, like the coating 218*b*, may cover all or a partial portion of each of the slot motor components as the design of the contact arm assembly 102, line terminal assembly 109, arc plate assembly 108 or any other design features may dictate.

In alternate embodiment of the present invention as shown in FIG. 14, the magnetically permeable material 218*a* can be encapsulated in a casing 207 by using two premade mateable upper and lower casings 205, 206 for each of the components of slot motor assembly 106. As shown in FIG. 14, base component 201 may be insulated with a casing 207 using casings 205, 206 each having the contours of the surface area of the magnetically permeable material 218*a*. The magnetically permeable material 218*a* of the base component 201 can be placed inside the lower casing 206 having preferably and substantially the same contour as the magnetically permeable material 218*a*. The upper casing 205 can then be positioned over the magnetically permeable material 218*a* and the lower casing 206. Thereafter, the two casings 205, 206 can be joined by various means. The least expensive and less time consuming way is for the two casings to be snap joined to each other. In this embodiment, the perimeter of one of the casings can be made slightly smaller so as to allow the smaller casing to fit within the perimeter of the larger casing. Other interference fit or mechanical means of joining the casings may be used without departing from the invention.

Alternatively, the two casings 205, 206 for the base component 201 and the associated casings for the two legs 202, 206 and side panels 210, 211 can be joined by the application of heat around the seams of the casing 207 so as to fuse the two casing 205, 206 together. Yet still, the casings of any of the components of the slot motor assembly 106 may be joined by other well known means such as an interference fit, ultrasonic welding, friction fit, snap fit, or other locking methods known to someone skilled in the art. It should be noted that all embodiments as to magnetically permeable material, coating, and use of a casings referenced above are equally applicable to all the other components such as legs 202, 203 and side panels 210, 211.

The parts of two casings 205, 206 for the base component 201 and the associated casings for the two legs 202, 206 and side panels 210, 211 can be implemented using an injection compression process with over molding. The steps are as follows: the molding cavity and core open, the slot motor metal insert is placed on supporting pins, the mold closes, plastic material flows into the mold, the material solidifies, and the finished parts is ejected. A possible alternative would be to injection mold separate pieces and secure them around the metal insert.

Returning back to FIG. 15, the functional cooperation of line terminal assembly 109, arc place assembly 108, slot motor assembly 106, and contact arm assembly 102 are shown. The placement of the base component 201 between the primary portion 301 and the opposing portion 302 in the manner shown in FIG. 15, has several advantages. In particular, the placement of the rear portion 209 of base component 201 underneath the arc plate assembly 108 and the placement of the arc plate assembly 108 close to the rear faces 234, 236 of legs 205, 206 allows for the arc plate assembly 108 and the slot motor assembly 106 to carry a greater flux density. The current flowing in the opposing portion 302 of the line terminal assembly 109 creates a magnetic field at location B2 that tends to repel the contact arm in an opening direction. If the rear portion 209 of base component 201 were not present, then the primary portion 301 of the line terminal assembly 109 would create an opposing magnetic field, which, superimposed at location B2, tends to cancel and reduce the repulsion effect. However, the presence of the rear portion 209 of base component 201 serves to shield location B2 from undesirable effects of the current in the primary portion 301. Rather, it redirects the field caused by the primary portion 301 into a favorable direction. Furthermore, the rear portion 209 of base component 201 greatly intensifies the favorable magnetic field caused by the opposing portion 302. So, the field crossing through the contact arm at B2 is produced by the primary portion 301 and the opposing portion 302 and is magnified and redirected by the magnetically permeable material. The force on the contact arm at location B2 is caused by the current in the contact arm which crosses through the magnetic field according to:

$F=\partial J\times B$ dVol where

F=magnetic force vector
J=current density vector
X designates a vector cross product
B=magnetic flux density vector This field also crosses between the contacts themselves as the contact arm opens, to push the arc in the direction of the arc plates 546. So, all of these effects also benefit movement of the arc.

When circuit breaker contacts open, current continues to flow for a short time by arcing across the air space between the contact arms 103*a*, 103*b*. When the contacts open far enough, the arc is extinguished and the current stops. Minimizing the arc is important for several reasons. First, arcing can significantly damage the contacts. Secondly, the arc ionizes gases inside the circuit breaker housing. If the arc isn't extinguished quickly the pressure from the ionized gases can cause the circuit breaker housing to rupture. A third reason would be that the time arcing is present is directly related to the amount of let through energy and therefore directly related to the damage to connected equipment. Circuit breakers commonly use an arc plate assembly 108 to quench the arc. This arc plate assembly 108 is made up of several "U" shaped steel plates that surround the contact arms 103*a*, 103*b*. As the arc develops, the arc is drawn to the arc plates 546 where it is divided into smaller arcs, and extinguished faster. Lastly, it should be understood that the time arcing is present is directly related to the amount of let through energy and therefore has a direct relation to the amount of damage sustained to all associated components.

FIG. 15 illustrates the various components of the slot motor assembly 106 and line terminal assembly 109 having the primary portion 301 and opposing portion 302, a stationary contact pad of the contact arm 103*a* coupled to the opposing portion 302, by brazing or the like, and the slot motor assembly 106 comprising base component 201 side panels 210, 211 and legs 202, 203. The opposing portion 302, base component 201, and an arc runner 436 are coupled to an end of the opposing portion 302. Coupling may be by a suitable threaded fastener, or the like. The slot motor assembly 106 and in particular the base component 201 may be coupled to the line terminal assembly 109 by a fastener (such as a set screw or the like) that may force the base component 201 against a bottom surface of the opposing portion 302.

Figure 18:
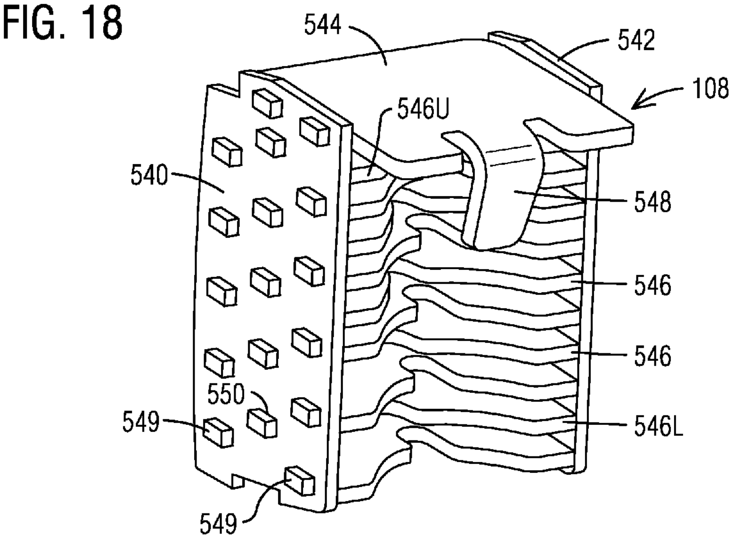
FIG. 18 is an isometric view of the arc plate assembly.

FIG. 18 illustrates an embodiment of an arc plate assembly 108. The arc plate assembly 108 may include side plates 540, 542, top plate 544 and a plurality of arc plates 546 and may (a few labelled) include lowermost arc plate 546L and uppermost arc plate 546U. The side plates 540, 542 may be a VO rated fiberglass or other suitable insulating material. Top plate 544 may include an arc horn 548. Each of the arc plates 546, 546L, 546U is preferably identical to one another. The arc plates 546, 546L, 546U may be made of steel and may be plated with nickel. The arc plates 546, 546L, 546U may have a thickness of between about 2 mm and 4 mm, and a width between the side plates 540, 542 of less than about 50 mm, for example. Other thicknesses and widths may also be used without departing from the invention.

Each of the arc plates 546, 546L, 546U may include two tabs 549 on one lateral end, and only one tab 550 on the other lateral end. The tabs 549, 550 may be received in slots formed in side plates 540, 542. Having only three tabs per arc plate 546 promotes ease of manufacture. Every other arc plate 546 is flipped over within the arc plate assembly 108. Thus, every other arc plate 546 has only one tab 550 attached at a same side plate 540 or 542. For example, as shown in FIG. 18, the lower-most arc plate 546L may attach to the side plate 540 with two tabs 549, while only one tab 550 of the lowermost arc plate 546 may attach to the second side plate 542. On the next arc plate 546 above the lower-most arc plate 546L, the arc plate 546 is reversed (e.g., flipped), and only one tab 550 is attached to the side plate 540, while on the other end two tabs are attached to the side plate 542. The attachment may be by crimping to deform a portion of the tabs 549, 550, such as by use of a suitable crimping die or other crimping or deforming means.

Figure 19:
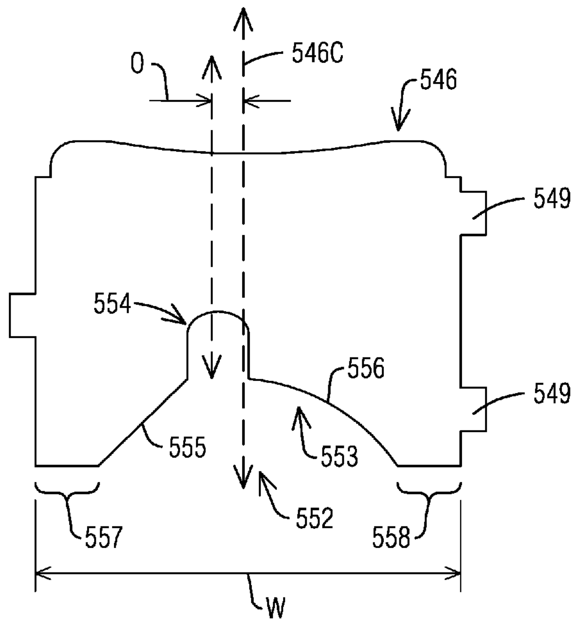
FIG. 19 is a planar view of an arc plate within the arc plate assembly.

As shown in FIG. 19, each of the arc plates 546, 546L, 546U (a representative arc plate shown) includes a compound recess 552. The compound recess 552 may have a primary recess 553 formed into the front of the arc plate 546, and a smaller secondary recess 554 formed into the primary recess 553. Thus, the arc plates 546, 546L, 546U are provided with two discontinuous shapes. The secondary recess 554 may be slightly offset from a physical center 546C of the arc plate 546 by an offset distance "0." Offset distance "0" may be between about 2 mm and about 5 mm, for example. Other offset distances "0" may be used. The primary recess 553 may itself comprise a compound shape. For example, a first side portion 555 on a first side of the secondary recess 554 may be a different shape than the second side portion 556. For example, the first side portion

555 may be a straight line, and the second side portion 556 may be a radius. Other compound shapes may be used.

On either front side of the arc plates 546, 546L, 546U, magnetic flux conducting portions 557, 558 may be provided. The magnetic flux conducting portions 557, 558 are end portions of the arc plates 546, 546L, 546U that are positioned adjacent to the respective legs 202, 203, and in very close proximity thereto. The magnetic flux conducting portions 557, 558 are large enough and positioned close enough to ensure good magnetic flux travel into the arc plates 546, 546L, 546U from the legs 202, 203 of the slot motor assembly 106.

FIG. 15 illustrates the relatively close proximity of the components and the magnetic flux lines in the slot motor assembly 106 and arc plate assembly 108 during contact separation. In operation, when a tripping event occurs, such as due to a current over the rated current of the phase, rapid rotation of contact arms 103*b* occur due to magnetic repulsion forces. The inclusion of the slot motor assembly 106 causes the contact arm 103*b* to rapidly rotate and move from a closed (ON) configuration to a blown-open configuration. In accordance with one or more embodiments, during electrical contact separation, improved magnetic repulsion forces are generated within the slot motor assembly 106 and arc plate assembly 108. In particular, a distance (d) (see FIG. 115) between the rear faces 234, 236 of the first and second legs 202, 203 and the front edges of at least some of the arc plates 546 may be minimized, while leaving only enough space to provide adequate insulation there between, i.e., they are positioned exceedingly close to one another. The insulation may be provided by a combination of coating 218*b* and casing 207.

The distance (d) is measured between the rear faces 234, 236 of the first and second legs 202, 203 and the magnetic flux conducting portions 557, 558 of the arc plates 546, 546L, 546U. For example, the dimension (d) may only be large enough to allow insertion of the first and second legs in front edges of the arc plates 546, 546L, 546U. The casing 207 thickness may be less than about 4 mm, for example. At least some of the plurality of arc plates 546, 546L, 546U may be positioned at less than a distance (d) from the rear faces 242, 244. Although the preferred distance is about 4 mm, the distance (d) may be about 3 mm or less, about 2.5 mm or less, or even about 2.0 mm or less in some embodiments. For example, 50% or more of the arc plates 546, 546L, 546U may be spaced at the distance (d) being about 4 mm or less, about 3 mm or less, about 2.5 mm or less, or about 2.0 mm or less. The closer the arc plates 546, 546L, 546U are positioned to the legs 202, 203, the more effective the magnetic flux conduction into the arc plates 546, 546L, 546U will be.

Figure 16:
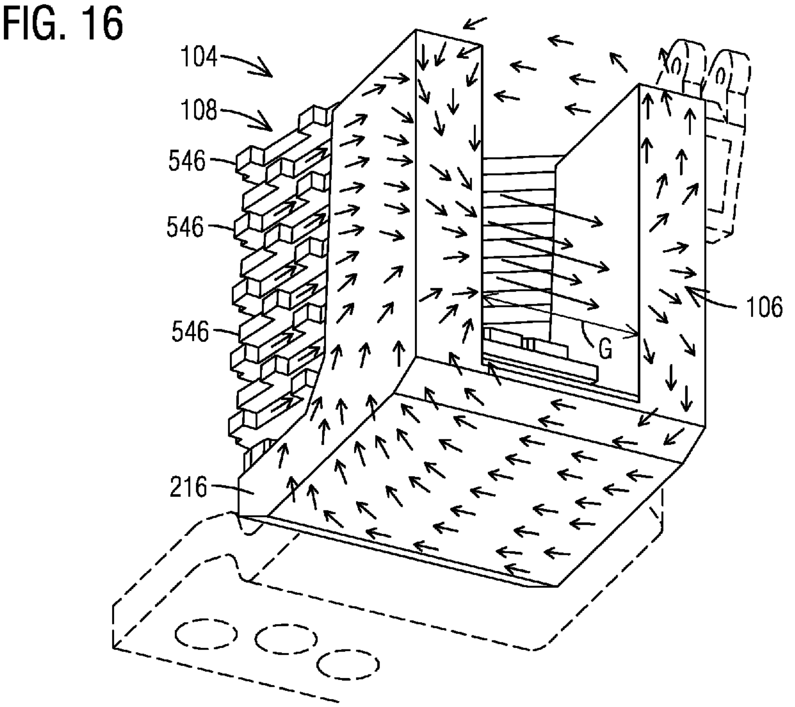
FIG. 16 is a bottom perspective illustration of the magnetic fields flowing within the slot motor assembly and arc plate assembly.
Figure 17:
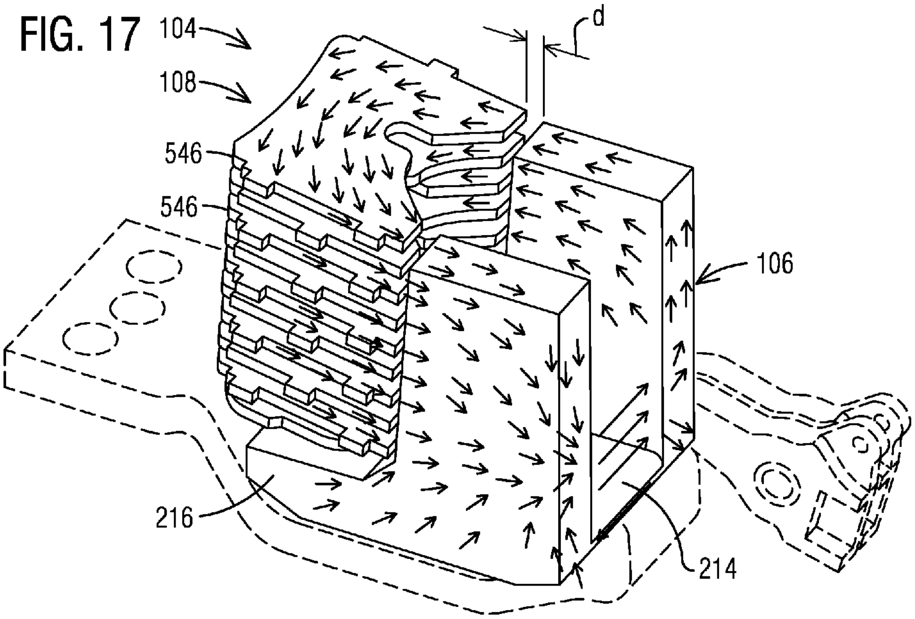
FIG. 17 is top perspective illustration of the magnetic fields flowing within the slot motor assembly and arc plate assembly.

As shown in FIGS. 15 and 16, 17, in some embodiments, a majority of the arc plates 546 are positioned in close proximity to the legs 202, 203 of the slot motor assembly 106. The arc plates 546 of the arc plate assembly 108 themselves provide a return path for the magnetic flux, as indicated by the numerous model arrows on the arc plates 546. As discussed above, providing at least some of the plurality of arc plates 546 within about 4 mm or less from the rear faces 234, 236 of the first leg 202 and the second leg 203 increases the return path for the magnetic field. This is in addition to the return path provided by base component 201, legs 202, 203, side panels 210, 211 and in particular to the rear portion 209 of base component 209. Accordingly, it should be recognized that the increased amount of magnetically permeable material 218*a* in the rear portion 209 further reduces the overall reluctance of the magnetic circuit.

Because the overall reluctance of the magnetic circuit is reduced by carrying flux in at least some of the arc plates 546 and rear portion 209, the amount of flux crossing through the slot motor air gap "G" is increased (See FIG. 16). Some of this flux crosses through the current in the contact arm assembly 102, which generates improved Lorentz force, which drives the one or more involved contact arm(s) 103*b* toward the open position. Because the intensity of the flux is increased, the Lorentz force is also increased. The increased flux density also exists as the one or more contact arm(s) 103*b* begin to open. Accordingly, this feature improves the resulting arc force, and further drives arc into the arc plates 546, 546L, 546U.

Figure 20:
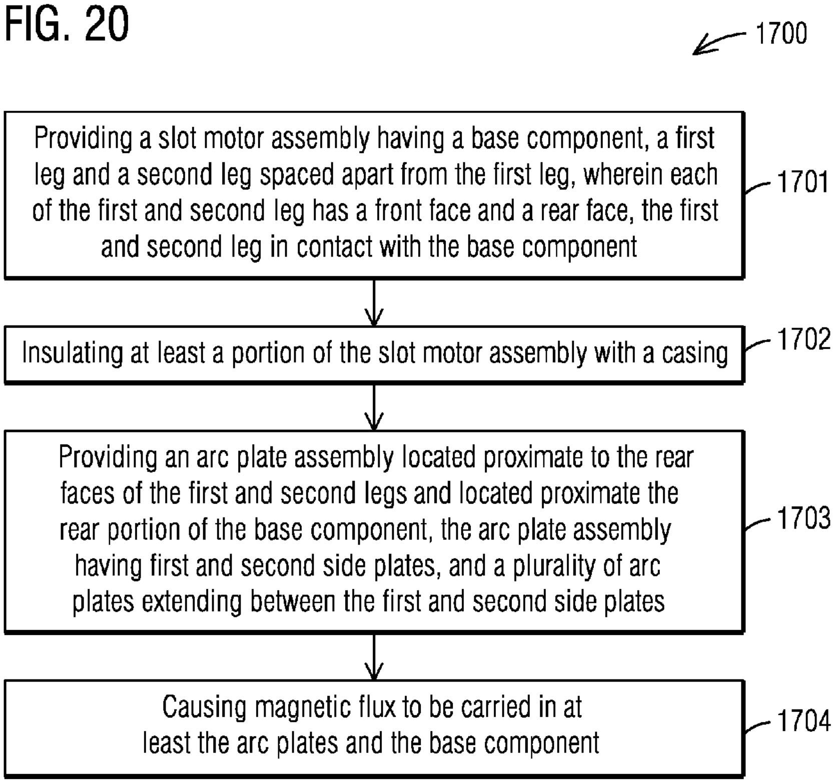
FIG. 20 is a flowchart illustrating a method of operating the slot motor assembly and arc plate assembly combination.

FIG. 20 is a flowchart that illustrates a method of operating the slot motor assembly 106 and arc plate assembly 108 combination according to embodiments. The method 1700 includes, in step 1701, providing a slot motor assembly 106 having a first leg 202 and a second leg 203 spaced from the first leg 202, wherein each of the first leg 202 and the second leg 203 each has a front face 230, 232, and a rear face 234, 236, and base component 201 positioned between the first leg 202 and the second leg 203, and the base component having a rear portion 209 that extends in a rearward direction from the rear faces 234, 236. The method 1700 includes, in step 1702, insulating at least a portion of the slot motor assembly with a casing. The method of 1700 includes, in step 1703, providing an arc plate assembly 108 located proximate to the rear faces 234, 236 of the first and second legs 202, 203 and located proximate the rear portion 209 of the base component 201, the arc place assembly having first and second side plates, and a plurality of arc plates extending between the first and second side plates. The method of 1700 comprises, in step 1704, causing the magnetic flux to be carried in at least the arc plates 546 and the base component 201.

While the invention is susceptible to various modifications and alternative forms, specific embodiments and methods thereof have been shown by way of example in the drawings and are described in detail herein. It should be understood, however, that it is not intended to limit the invention to the particular apparatus, systems, or methods disclosed, but, to the contrary, the intention is to cover all modifications, equivalents and alternatives falling within the scope of the invention.

What is claimed is:

1. A slot motor assembly and arc plate assembly combination for use in a switch device:

a modular slot motor assembly of multiple separate pieces comprising a first leg as a first individual part, a second leg as a second individual part and a base component as a third individual part wherein the second leg is spaced from the first leg and each of the first and second legs have a rear face and a front face and the base component has a front and rear portion, the first and second legs in contact with the base component, and wherein at least a portion of the modular slot motor assembly is insulated with a casing;

an arc plate assembly having a first and second side plates and a plurality of arc plates between the first and second side plates and positioned proximate the rear portion of the base component and the rear faces of the first and second legs; and a means for securing the modular slot motor assembly to a subcomponent housing, wherein the means for securing comprises a locking component connected to the modular slot motor assembly and a mating portion connected to the subcomponent housing such that the locking component slidably engages with the mating portion, wherein the mating portion is a portion of a wall within the subcomponent housing and the locking component is attached to either the first leg, the second leg or side panels of each leg of the modular slot motor assembly.

2. A slot motor assembly and arc plate assembly combination of claim 1, wherein the at least one leg of the first and second legs and the base component of the modular slot motor assembly comprise of an epoxy coating.

3. A slot motor assembly and arc plate assembly combination of claim 1, wherein the first and second legs comprise a non-uniform transverse thickness.

4. A slot motor assembly and arc plate assembly combination of claim 3, wherein the non-uniform transverse thickness comprises a relatively greater thickness adjacent the rear faces of the first and second legs.

5. A slot motor assembly and arc plate assembly combination of claim 1, wherein a cross-sectional area extending longitudinally through the front and rear portions of the base component is greater than or equal to the cross sectional area through one of the first leg and the second leg.

6. A slot motor assembly and arc plate assembly combination of claim 1 wherein at least one of the first and second legs of the modular slot motor assembly has a thickness at the rear face which is greater than a thickness of the front face.

7. A slot motor assembly and arc plate assembly combination of claim 1 wherein the base component comprises a magnetically permeable material having a first insulating coating and a second insulating casing.

8. A slot motor assembly and arc plate assembly combination of claim 7 wherein the second insulating casing is applied via an overmolding process.

9. A slot motor assembly and arc plate assembly combination of claim 1 wherein a distance (d) between the rear faces of the first and second legs of the modular slot motor assembly and at least some of the arc plates of the arc plate assembly are proximate the rear faces and is less than about 4 mm.

10. A switch for interrupting current flow comprising:

a subcomponent housing having a first mating feature; and a modular slot motor assembly of multiple separate pieces, the modular slot motor assembly comprises at least two components wherein at least one component of the at least two components of the modular slot motor assembly having a second mating feature that is configured to lockingly engage with the first mating feature of the subcomponent housing to secure the modular slot motor assembly to the subcomponent housing, wherein at least a portion of the modular slot motor assembly is insulated with a casing, wherein the at least two components of the modular slot motor assembly of multiple pieces include a first leg as a first individual part, a second leg as a second individual part or a base component as a third individual part, wherein the second mating feature comprises a locking component connected to the modular slot motor assembly and the first mating feature comprises a mating portion connected to the subcomponent housing such that the locking component slidably engages with the mating portion, wherein the mating portion is a portion of a wall within the subcomponent housing and the locking component is attached to either a first leg, a second leg or side panels of each leg of the modular slot motor assembly.

11. A switch of claim 10, further comprising:

an arc plate assembly having a first and second side plates and a plurality of arc plates between the first and second side plates, wherein the second leg is spaced from the first leg and each of the first and second legs have a rear face and a front face and the base component has a front and rear portion, the first and second legs in contact with the base component, wherein the plurality of arc plates are positioned proximate the rear portion of the base component and the rear faces of the first and second legs.

12. A switch of claim 11, wherein the at least one of the first and second legs and the base component of the modular slot motor assembly comprise of at least one of powdered metal and an epoxy coating.

13. A switch of claim 11, wherein the first and second legs comprise a non-uniform transverse thickness, wherein the non-uniform transverse thickness comprises a relatively greater thickness adjacent the rear faces of the first and second legs.

14. A switch of claim 11, wherein a cross-sectional area extending longitudinally through the front and rear portions of the base component is greater than or equal to the cross sectional area through one of the first leg and the second leg.

15. A switch of claim 11, wherein at least one of the first and second legs of the modular slot motor assembly has a thickness at the rear face which is greater than the thickness of the front face.

16. A switch of claim 11, wherein the base component comprises a magnetically permeable material having a first insulating coating and a second insulating casing, wherein the second insulating casing is applied via an overmolding process.

17. A switch of claim 10, wherein the first mating feature and the second mating feature form dovetail securing means for securing the modular slot motor assembly to the subcomponent housing.

18. A method of operating a slot motor assembly and arc plate assembly combination comprising:

providing a modular slot motor assembly of multiple separate pieces having a first leg as a first individual part and a second leg as a second individual part spaced from the first leg, wherein each of the first leg and the second leg has a front face, and a rear face and a base component as a third individual part positioned between the first leg and the second leg, the base component having a rear portion that extends in a rearward direction from the rear faces;

slidably engaging a mating portion connected to a subcomponent housing with a locking component connected to the modular slot motor assembly, wherein the mating portion is a portion of a wall within the subcomponent housing and the locking component is attached to either the first leg, the second leg or side panels of each leg of the modular slot motor assembly;

insulating at least a portion of the modular slot motor assembly with a casing;

providing an arc plate assembly located proximate to the rear faces of the first and second legs and located proximate the rear portion of the base component, the arc plate assembly having first and second side plates, and a plurality of arc plates extending between the first and second side plates; and causing a magnetic flux to be carried in at least the arc plates and the base component.

* * * * *